Feb. 16, 1937. F. SBICCA Re. 20,274

COMPLEMENTARY INSOLE-OUTSOLE COMBINATION SHOE AND METHOD OF PRODUCING SAME

Original Filed Nov. 7, 1931 3 Sheets-Sheet 1

INVENTOR
Frank Sbicca
BY
Watson, Bristol, Johnson & Leavenworth
ATTORNEYS

Feb. 16, 1937. F. SBICCA Re. 20,274

COMPLEMENTARY INSOLE-OUTSOLE COMBINATION SHOE AND METHOD OF PRODUCING SAME

Original Filed Nov. 7, 1931 3 Sheets-Sheet 2

INVENTOR
Frank Sbicca
BY
Watson, Bristol, Johnson & Leavenworth
ATTORNEYS

Feb. 16, 1937. F. SBICCA Re. 20,274

COMPLEMENTARY INSOLE-OUTSOLE COMBINATION SHOE AND METHOD OF PRODUCING SAME

Original Filed Nov. 7, 1931 3 Sheets-Sheet 3

INVENTOR
Frank Sbicca
BY
Watson Bristol Johnson & Leavenworth
ATTORNEYS.

Reissued Feb. 16, 1937

Re. 20,274

UNITED STATES PATENT OFFICE 20,274

COMPLEMENTARY INSOLE-OUTSOLE COMBINATION SHOE AND METHOD OF PRODUCING SAME

Frank Sbicca, Philadelphia, Pa., assignor to Sbicca-Method Shoes Incorporated, Philadelphia, Pa., a corporation of Delaware Original No. 1,902,725, dated March 21, 1933, Serial No. 573,676, November 7, 1931. Application for reissue December 23, 1933, Serial No. 703,854

13 Claims. (Cl. 12—146)

This invention relates to complementary insole-outsole combinations and to a method of producing the same.

An important object of the present invention is the provision of a method of producing complementary insole-outsole combinations from a sole leather blank in which all the material is utilized and an absolute fit assured between the insole and outsole in the completed shoe.

It is a further object of this invention to provide a complementary insole and outsole combination cut from a single blank, in which the insole is a unitary member consisting of a forepart rand, a heel portion, and a shank portion.

A further object of the invention is the provision of a method of producing such combinations which may be readily carried out at the factory and by use of machines commonly employed at the factory with but inexpensive modifications thereof.

These and other objects I attain by the construction shown in the accompanying drawings wherein, for the purpose of illustration, I have shown a preferred embodiment of my invention, and wherein.

Referring now more particularly to the drawings, the numeral 10 generally designates a sole blank having flesh and grain sides indicated respectively at 11 and 12. This blank in the production of the combination is passed through the following steps which while given in a preferred order, may obviously be interchanged in the order in which they are described.

Figure 15:
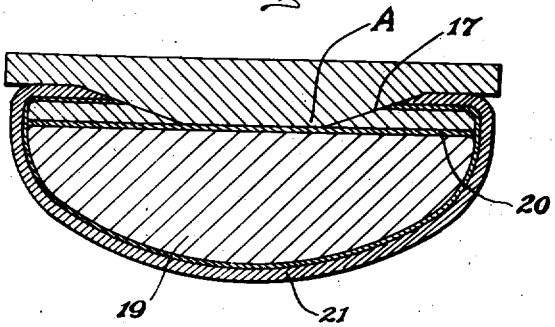
Figure 16:
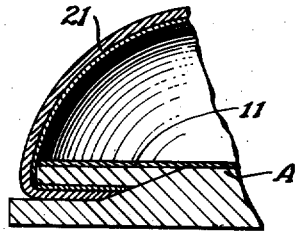
Fig. 16 is a fragmentary vertical sectional view across the forepart of a complete shoe.

A split 13 is formed in the blank 10, this split paralleling the flesh and grain sides of the blank and extending from the rear end of the heel of the blank to a transverse line 14 at the junction of the ball and shank sections of the blank. A rand 15 is then separated from the margin of the ball section of the shoe at the flesh side thereof, this rand being removed by a combination of horizontal and inclined channel cuts 16 and 17, of which the horizontal channel forms a continuation of the split 13 extending inwardly from the blank margins a predetermined distance and extending entirely about the ball section. The inclined channel extends about the margins of the ball section of the blank and is directed downwardly and outwardly from the flesh side of the blank, terminating at its lower end at the inner end of the horizontal channel 16. The inclined channel has a branch 18 extending between the inner ends thereof coinciding with the forward end of the split 13 so that the insole blank is severed from the outer sole entirely about the projection A formed on the ball section of this sole. These operations completely free the insole and it will be obvious that the insole and outsole must be absolutely complementary and will, accordingly, interfit perfectly in the assembly of the shoe as shown in Fig. 15, where the insole is located on the bottom of a last 19 and has an upper 21 lasted thereto. Additionally, it will be noted that all of the material is utilized in the production of the insole-outsole combination, the insole comprising merely those unitary portions of the flesh side of the blank removed in the formation of the projection A upon the upper surface of the outer sole.

The process employed in the production of shoes by use of combinations of this character is preferably that set forth in my prior Patent 1,838,708 of December 29, 1931, but may obviously be employed in the production of other shoes.

Figure 1:
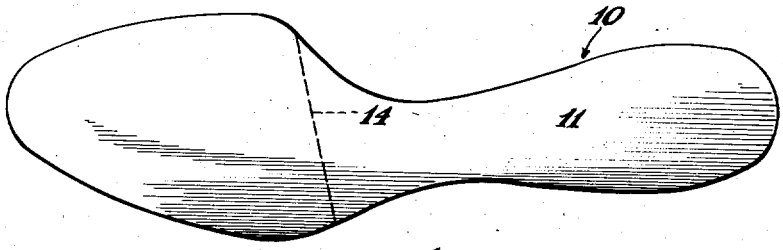
Figure 1 is a plan of a sole blank illustrating the same as split in the performance of one step of the process.
Figure 2:
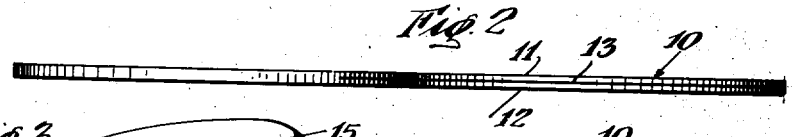
Fig. 2 is a side elevation of the blank of Fig. 1.
Figure 3:
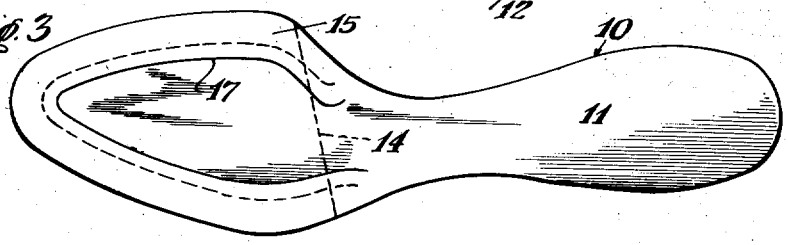
Fig. 3 is a plan of the blank channeled in the performance of a second operation.
Figure 4:
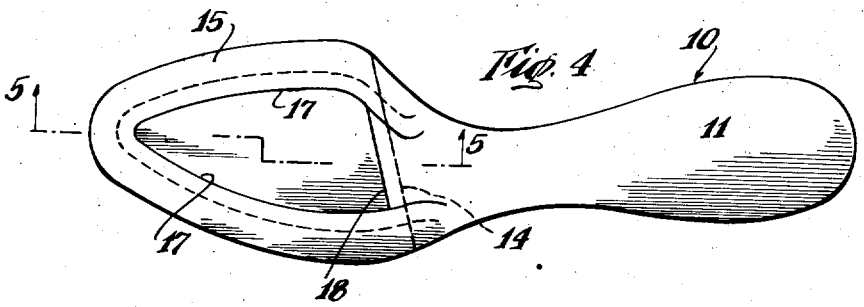
Fig. 4 is a plan of the blank showing a further channeling operation.
Figure 5:
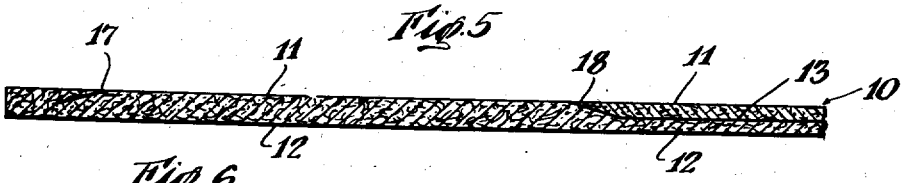
Fig. 5 is an enlarged section on the line 5—5 of Fig. 4.
Figure 6:
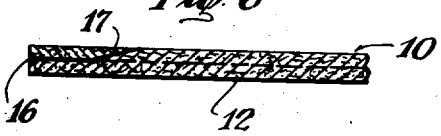
Fig. 6 is a fragmentary section on the line 6—6 of Fig. 7.
Figure 7:
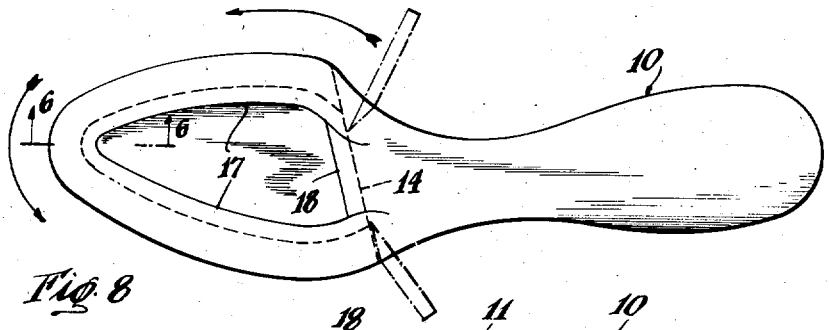
Fig. 7 is a plan of the blank illustrating a still further step in the process, the arrows indicating the movement of the splitting knife.
Figure 8:
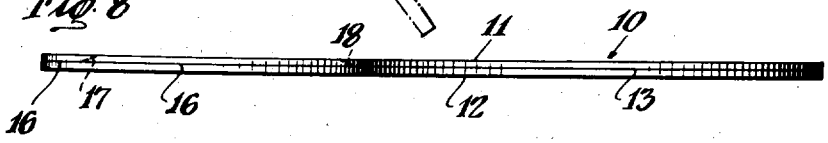
Fig. 8 is a side elevation of the blank of Fig. 7 after completion of the splitting process illustrated therein.
Figure 9:
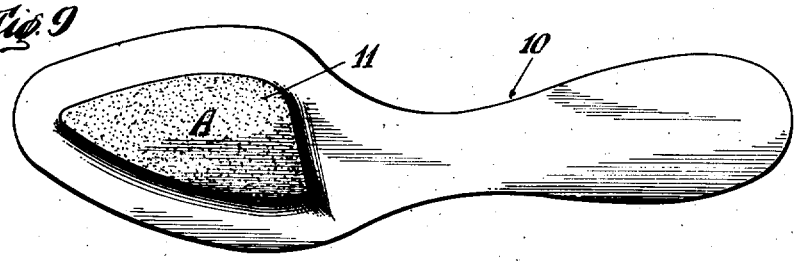
Fig. 9 is a top plan of the outer sole.
Figure 10:
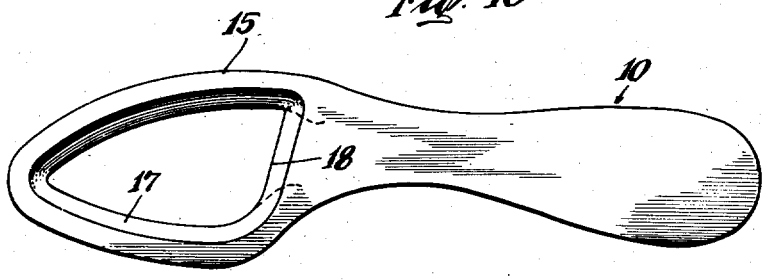
Fig. 10 is a bottom plan of the inner sole.
Figure 11:
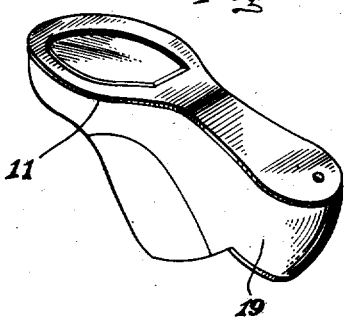
Fig. 11 is a perspective view showing an insole located on the bottom of the last for assembly in a shoe.
Figure 12:
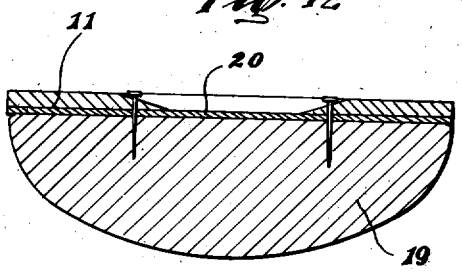
Fig. 12 is a transverse vertical sectional view across the forepart of a last having the insole located thereon.
Figure 13:
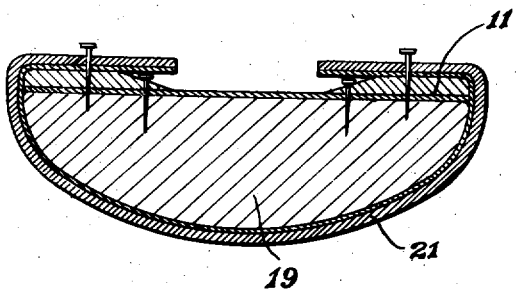
Figs. 13, 14 and 15 are transverse vertical sectional views illustrating steps in the assembly of a shoe having an insole and outsole constructed in accordance with the present invention
Figure 14:
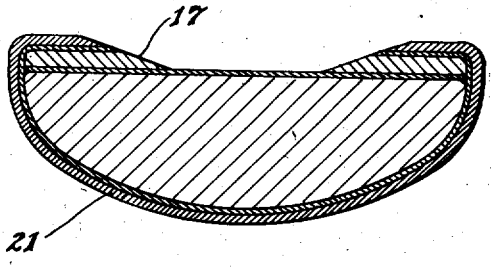

As described in my prior patent, a shoe may be assembled by locating the insole on the bottom of a last 19 in the usual manner, preferably after first applying a sheet 20 of paper, or like reinforcing material, across the insole aperture. An upper 21 which may be of any suitable type and is here illustrated (Fig. 13) as comprising an upper ply and a lining ply is pulled over the last and cement is applied between its lasting allowance and the marginal portion of the insole. The lasting allowance is held down against the insole by temporary tacks until this cement sets, whereupon the tacks are removed. Any excess lasting allowance is then trimmed (Fig. 14), this trimming serving to prevent the lasting allowance material from encroaching on the insole aperture at 17 and 18. The bottom of the shoe thus formed is roughed or otherwise prepared for cement affixation of a complementary outsole which is marginally coated with cement and assembled (Fig. 15) with and cement affixed to the bottom of the lasted upper with its projection A exactly fitting the forepart aperture defined by cuts 17 and 18. When the sole affixing cement has set, the shoe is delasted and the temporary reinforcement 20 is torn out. If desired, it may be replaced by a conventional sock lining. The flesh surface of the projection A is exactly even and flush with the flesh surface of the insole in the assembled shoe.

Since, as hereinbefore noted, the particular order of the steps employed in the production of the insole is immaterial, it is to be understood that I do not wish to be limited to the order of recitation thereof in the appended claims.

I claim:

1. The method of producing complementary insole-outsole combinations comprising the following steps, providing a leather sole blank of the desired thickness of the combination and having a grain and a flesh side, splitting the heel and shank portions of the sole blank to form insole and outsole shank pieces, removing a rand from the margin of the ball section of the flesh side of the sole while leaving the same attached to the forward end of the insole shank piece, and splitting the sole between the shank and ball sections by a cut extending inwardly from the flesh side thereof to the depth of the desired insole and between the rand terminals.

2. The method of producing complementary insole-outsole combinations comprising the following steps, providing a leather sole blank of the desired thickness of the combination and having a grain and a flesh side, splitting the heel and shank portions of the sole blank to form insole and outsole shank pieces, removing a rand from the margin of the ball section of the flesh side of the sole while leaving the same attached to the forward end of the insole shank piece and cutting inwardly from the flesh side of the sole blank to a depth equal to the thickness of the desired insole and on a transverse line extending from terminal to terminal of the rand.

3. The method of producing complementary insole-outsole combinations comprising the following steps, providing a leather sole blank of the desired thickness of the combination and having a grain and flesh side, splitting the heel and shank portions of the sole blank to form insole and outsole shank pieces, removing a rand from the margin of the ball section of the flesh side of the sole while leaving the same attached to the forward end of the insole shank piece and forming a cut extending transversely from terminal to terminal of the rand and inwardly from the flesh side of the blank to the forward end of the split severing the heel and shank portions of the blank.

4. The method of producing complementary insole-outsole combinations comprising the following steps; providing a sole blank of predetermined shape and thickness, splitting the heel and shank portions of said blank to form insole and outsole shank pieces, forming a rand from the margin of the ball section of the upper side of the blank while leaving the same attached to the forward end of the insole shank piece, and cutting the said upper side of the blank between the shank and ball sections to a depth equal to said split, whereby to free said insole from said outsole.

5. The method of preparing a complementary insole-outsole combination which comprises the steps of providing a sole leather blank, providing the flesh side of the blank with a transversely inclined cut at the junction of the ball line and the shank portion, splitting said blank from the heel portion forwardly to meet said cut to provide an insole shank piece, and cutting a rand from the marginal edge of the flesh side of the blank while leaving the rand attached to the said shank piece.

6. The method of preparing a complementary insole-outsole combination which comprises the steps of providing a sole leather blank of substantially the thickness of the desired combination, providing the blank with an inclined cut extending from the flesh side in the direction of the thickness of the blank to a predetermined level, said cut extending along the junction of the ball line and the shank portion from a point on one side spaced from the one edge to a point on the other side spaced from the other edge, splitting the blank parallel to the faces thereof forwardly from the heel to the said diagonal cut, and at a depth corresponding substantially to the depth of said cut, and severing a rand from the margin of the ball section, said rand being left attached to said split off portion of the blank and being substantially equal in thickness thereto.

7. The method of making a composite sole consisting of an insole and an outsole which comprises providing a sole blank of the desired final thickness in the finished shoe and having a flesh and a grain side, making a transverse cut in the flesh side at the ball line to a depth corresponding to the desired thickness of the insole, splitting the heel and shank portions from the end of the heel to said transverse cut, and removing a rand from the margin of the ball section of the flesh side while leaving the same attached to the forward end of the insole shank piece, thus completely severing the insole from the outsole and forming a recess in the insole at the ball portion thereof and a complementary projection in the outsole.

8. The method of making a composite sole consisting of an insole and an outsole which comprises providing a sole blank of the desired final thickness in the finished shoe and having a flesh and a grain side, making a transverse cut in the flesh side at the ball line to a depth corresponding to the desired thickness of the insole, said cut being inclined downwardly toward the heel of the blank and the ends thereof terminating in spaced relation to the side edges of the blank, splitting the heel of said transverse cut, and removing a rand from the margin of the ball section of the flesh side while leaving the same attached to the forward end of the insole shank piece, thus completely severing the insole from the outsole and forming a recess in the insole at the ball portion thereof and a complementary projection in the outsole.

9. In a shoe, a composite sole having an insole section and an outsole section, said insole section having an inclined cut extending from one face to the other thereof and running along the junction of the ball line and the shank portion from a point on one side spaced from one edge to a point on the other side spaced from the other edge, a rand on said insole section and extending around the ball section of the sole and terminating at opposite sides of said cut, said rand defining with said cut an opening having internally bevelled edges, a shank and heel portion integral with said rand, said outsole section being complementary to said insole section and having a reduced marginal edge at the forepart to receive the said rand and having a raised portion which registers with the said opening, the top of said raised portion lying substantially flush with the top surface of said rand in the assembled shoe, said insole and outsole sections respectively comprising the flesh and grain sides of a single piece of sole leather.

10. In a shoe, a composite sole comprising stock from a single piece of sole leather and having the desired shape and thickness in the finished shoe and having a flesh and a grain side consisting respectively of an insole section and an outsole section, there being a transverse cut in the flesh side at the ball line to a depth corresponding to the thickness of said insole section, said cut being inclined downwardly toward the heel portion of the sole and terminating inwardly of the margin of the sole, the sole being severed at the heel as far forward as the said cut to form a shank and heel portion, a rand integrally formed with said shank portion of the insole member, said rand terminating on opposite ends of said cut and being of a thickness substantially equal to said shank portion, said rand defining with said shank an opening, and said outsole member having a reduced marginal edge at its forepart and being complementary to said insole member and having a raised portion which registers with said opening in the assembled shoe.

11. The method of producing complementary insole-outsole combinations comprising the following steps, providing a sole blank of predetermined shape and thickness, splitting the heel and shank portions of said blank to form insole and outsole shank pieces, forming a rand from the margin of the ball section of the upper side of the blank while leaving the same attached to the forward end of the insole shank piece, and cutting the said upper side of the blank between the shank and ball sections to free said insole from said outsole.

12. A method of producing complementary insole-outsole combinations comprising, providing a sole leather blank having the combined thickness of an insole and an outsole, splitting said blank between the heel and shank portions and also around the outer marginal forepart portion at a depth from its flesh surface corresponding to the required insole thickness, and cutting from the forward edge of said shank split and from the inner edge of said marginal forepart split in beveled planes inclined upwardly toward the central forepart portion of the blank and extending to the flesh surface of said blank so as to form an outsole from the grain side of said blank having reduced heel, shank and marginal forepart portions and a relatively thicker central forepart portion, and to form an insole from the flesh side of said blank having integral heel shank and forepart sections in which the forepart section comprises a marginal rand defining an opening complementary to the thicker central forepart portion of said outsole.

13. The method of preparing a complementary insole-outsole combination which comprises providing a sole leather blank, splitting the blank from the heel section forwardly to approximately the junction of the ball line and the shank portion to provide an insole shank piece, making a forwardly inclined transverse cut extending from the forward end of the split to the flesh side of the blank and terminating at points spaced laterally from the edge of the blank, and cutting a rand from the marginal edge of the flesh side of the blank while leaving the rand attached to said shank piece.

FRANK SBICCA.